United States Patent [19]

Hiraiwa

[11] Patent Number: 4,897,661
[45] Date of Patent: Jan. 30, 1990

[54] METHOD AND APPARATUS FOR DETERMINING THE POSITION OF A VEHICLE

[75] Inventor: Hisaki Hiraiwa, Kanagawa, Japan

[73] Assignee: Sony Corporation, Tokyo, Japan

[21] Appl. No.: 176,289

[22] Filed: Mar. 31, 1988

[30] Foreign Application Priority Data

Apr. 10, 1987 [JP] Japan ................................. 62-88437

[51] Int. Cl.⁴ .............................................. G01S 3/02
[52] U.S. Cl. ..................................... 342/457; 342/357
[58] Field of Search ................................ 342/357, 457

[56] References Cited

U.S. PATENT DOCUMENTS

4,353,065 10/1982 Mori .
4,359,733 11/1982 O'Neill ................................ 342/357
4,723,304 2/1988 Maeda .

Primary Examiner—Thomas H. Tarcza
Assistant Examiner—David Cain
Attorney, Agent, or Firm—Hill, Van Santen, Steadman & Simpson

[57] ABSTRACT

There is provided a system in which a transponder is carried by each vehicle traveling on or above the earth's surface which transmits a signal which is responsive to an interrogation signal to a ground station through two or more satellites and in the ground station, the position of the vehicle is determined from the propagation time differences of the response signals received via the satellites. In this system, the information indicative of the time lag which is required for the transponder to receive the interrogation signal and to transmit the response signal responsive to the interrogation signal is included in the response signal and then such response signal is transmitted. Thus, the time lag which is peculiar to each transponder and corresponds to the time required from the reception of the interrogation signal to the transmission of the response signal can be corrected. With this system, the positioning accuracy of each vehicle can be improved.

6 Claims, 5 Drawing Sheets

METHOD AND APPARATUS FOR DETERMINING THE POSITION OF A VEHICLE

BACKGROUND OF THE INVENTION

1. Field of the Invention

The present invention relates to a system for determining the position of a vehicle using two or more satellites.

2. Description of the Prior Art

A satellite-based system for determining the position of a vehicle and for communication service systems for use by moving objects such as vehicles, airplanes, ships, or the like which uses two or more artificial satellites and which can also perform message communication is being developed. Such a system is disclosed in U.S. Pat. No. 4,359,733, in which a transponder is carried by a moving object (hereinafter, simply referred to as a vehicle) and message communication between an operation center serving as a ground station and each vehicle is provided. Each transponder transmits a responsive signal to an interrogation signal from the operation center via each satellite. Thus, the operation center can determine the position of the vehicle on the basis of the time differences between the propagation times of the respective signals.

Such a satellite-based vehicle position determining and communicating service system can be used, for example, to manage movement of trucks in a transport company. For example, when using this system to manage the movement of trucks, transponders are attached to each of the trucks which are operated by the transport company. The trucks are distributed in every district and are moving and their positions constantly change. Message communication is also performed between the operation center and each truck. The operation center can monitor the velocity and present position of each truck. According to this system, the transport company can perform services such that a customer is informed of the time of arrival of a parcel, for example. On the other hand, the next schedule of moving a truck can also be planned, so that the trucks can be efficiently operated.

Such satellite-based vehicle position determining and communicating service systems include not only a one-way communicating service in which a message is unidirectionally communicated from a vehicle to the operation center but also a two-way communicating service in which a message is bidirectionally communicated between a vehicle and the operation center.

In the two-way communicating service, the position of a vehicle can be determined and at the same time, message communication can be performed between the vehicle and the operation center. Therefore, in the two-way communication service, an instruction for movement can be also given from the operation center to a vehicle.

Figure 1:
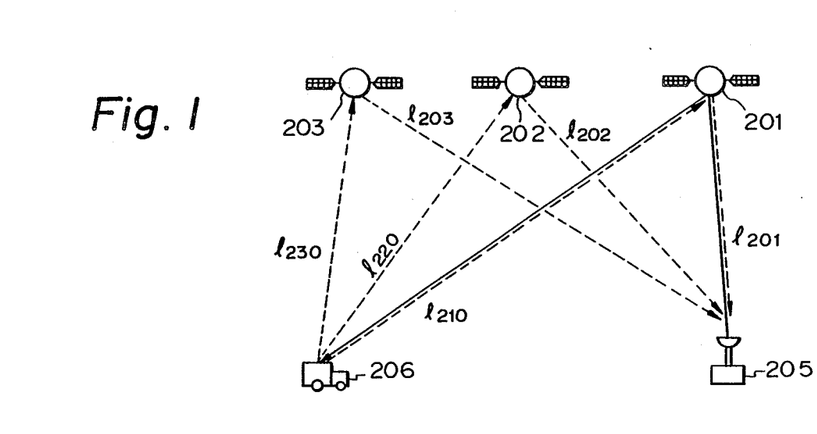
FIGS. 1 and 2 are conceptional diagrams for explaining satellite-based vehicle position determining and communicating systems using three satellites.

FIG. 1 is a conceptional diagram for explaining such a vehicle position determining system which uses satellites. The system in this diagram can obtain the position of each vehicle in three dimensions by using three satellites. A satellite 201 is a geostationary satellite for transmitting a signal from a vehicle 206 to a ground station 205 and for transmitting a signal from the ground station 205 to the vehicle 206. Satellites 202 and 203 are geostationary satellites for transmitting the signal from the vehicle 206 to the ground station 205.

When the position of the vehicle 206 is to be determined, an interrogation signal from the ground station 205 is sent to the vehicle 206 through the satellite 201. A transponder mounted in the vehicle 206 receives the interrogation signal from the ground station 205 and sends an output response signal in responsive to the interrogation signal. The response signal is received by the ground station 205 through the satellites 201, 202, and 203. In the ground station 205, the position of the vehicle 206 is calculated from the time differences of the response signals received from the satellites 201 to 203. The vehicle position is calculated on the basis of triangulation.

It is assumed that the distances from the ground station 205 to the satellites 201, 202, and 203 are respectively $l_{201}$, $l_{202}$, and $l_{203}$ and the distances from the satellites 201, 202, and 203 to the vehicle 206 are $l_{210}$, $l_{220}$, and $l_{230}$, respectively. An interrogation signal is transmitted from the ground station 205. It is assumed that the times when the response signal generated from the transponder of the vehicle in response to the interrogation signal reaches the ground station 205 through the satellites 201, 202, and 203 are $t_{201}$, $t_{202}$ and $t_{203}$, respectively. In this case, the following equations are satisfied (where, C denotes the velocity of light).

$$2(l_{201} + l_{210}) = C \cdot t_{201}$$

$$(l_{201} + l_{210}) + (l_{220} + l_{202}) = C \cdot t_{202}$$

$$(l_{201} + l_{210}) + (l_{230} + l_{203}) = C \cdot t_{203}$$

Since the distances $l_{201}$, $l_{202}$, and $l_{203}$ are already known, the distances $l_{210}$, $l_{220}$, and $l_{230}$ can be obtained if the times $t_{201}$, $t_{202}$, and $t_{203}$ are known. Thus, the position of the vehicle 206 can be three-dimensionally obtained.

On the other hand, the position of a vehicle can be also measured by using two satellites, e.g., the satellites 201 and 202. In this case, the vehicle position can be two-dimensionally measured. The measurement is performed on the assumption that one of three coordinates of latitude, longitude, and altitude, e.g., the altitude are known.

In the case for determining the vehicle position by use of, e.g., three satellites 201 to 203 on the basis of the time differences of the interrogation signal from the ground station 205 has been output until the response signals responsive to the interrogation signal are received from the transponder of the vehicle 206 through the satellites 201 to 203, respectively, if the times $t_{201}$, $t_{202}$, and $t_{203}$ until the response signals return to the ground station through the satellites 201, 202 and 203 are not accurately measured in the ground station, a position measurement error occurs. To prevent this, in the transponder, the response signal which is output in response to the interrogation signal from the ground station has to be completely time synchronized with the interrogation signal. However, a time lag of the response signal to the interrogation signal actually has a particular value in each transponder. For example, assuming that the time lag until the transponder transmits a response signal after it receives the interrogation signal deviates from a preset value by 10 nsec, a position measurement error of 3 m will result.

Therefore, in a conventional satellite-based vehicle position determining and communicating service system, a high speed device such as an ECL (emitter coupled logic) or the like is used as a circuit device for the transponder in the vehicle 206 or a time adjusting circuit is interposed, thereby allowing the time synchronization between the interrogation signal and the response signal in each transponder. However, the use of such high speed device causes the circuit size and cost to be increased. In addition, even if such a high speed device is used, it is difficult to make the time synchronization perfect between the interrogation signal and the response signal, so that variations in time lags of the transponders occur. Further, it is also difficult to perform adjustments so as to make the time lags of the transponders to coincide.

SUMMARY OF THE INVENTION

It is an object of the present invention to make it possible to independently set the time lags of the response signals to the interrogation signals of the transponders mounted in respective vehicles.

Another object of the invention is to enable a vehicle position to be accurately determined even when variations in time lags of the response signals to the interrogation signals of the transponders mounted on respective vehicles occur.

Still another object of the invention is to eliminate the necessity of a circuit having high response speed performance by permitting variations in time lags of the response signals to the interrogation signals of transponders mounted on respective vehicles.

According to the invention, there is provided a system in which a response signal to an interrogation signal of a transponder which is mounted on a vehicle is transmitted to a ground station through two or more satellites and in the ground station, the position of the vehicle is determined on the basis of the propagation time differences of the signals which are received from the satellites, wherein when the information of the peculiar time lag of the response signal to the interrogation signal of the transponder mounted on each vehicle is stored and the vehicle position is calculated, by correcting the propagation time on the basis of the information of the time lag so that the vehicle position can be accurately decided for each vehicle.

The above and other objects and features of the present invention will become apparent from the following detailed description and the appended claims when read with reference to the accompanying drawings.

BRIEF DESCRIPTION OF THE DRAWINGS

FIGS. 3a–3F are a timing chart of response signals to an interrogation signal;

DETAILED DESCRIPTION OF THE PREFERRED EMBODIMENT

An embodiment of the present invention is described hereinbelow with reference to the drawings.

Figure 2:
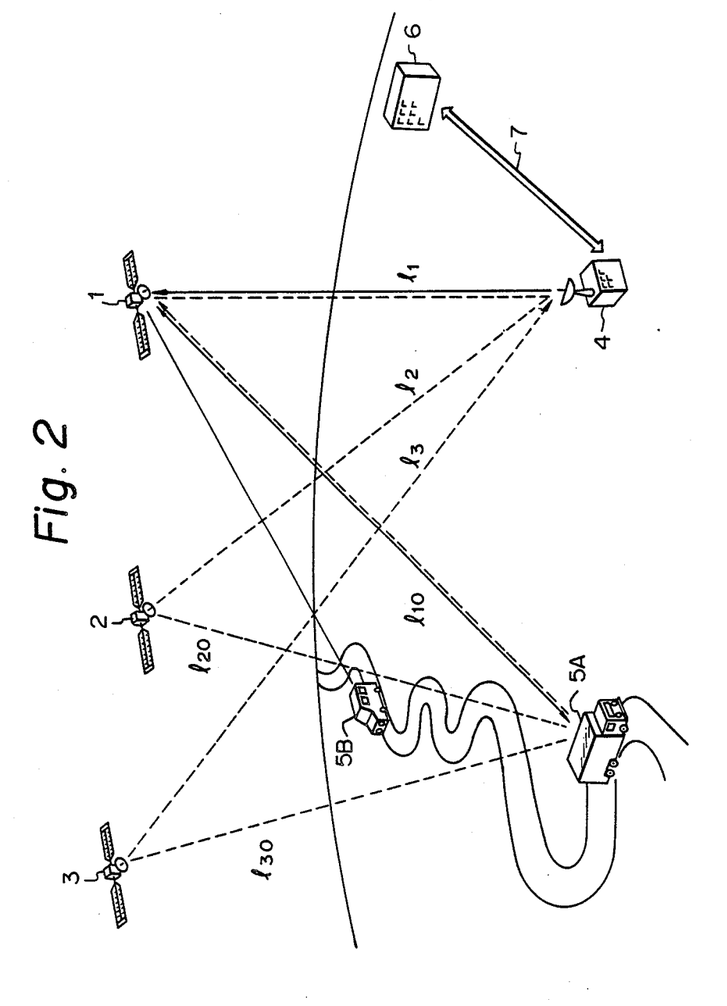

FIG. 2 shows an example of a satellite-based vehicle position determining and communicating service system to which the invention can be applied. This system can be used to control the movement of a plurality of vehicles.

In this system, communication is performed between an operation center 4 which serves as a ground station and each of the vehicles 5A and 5B by using three geostationary satellites 1, 2 and 3. The position of each of the vehicles 5A and 5B is determined three-dimensionally by using the three satellites 1, 2 and 3. The latitude, longitude, and altitude are obtained and the satellite 1 among three satellites is used to perform two-way communication between the operation center 4 and each of the vehicles 5A and 5B. The other satellites 2 and 3 are used to transmit signals from the vehicles 5A and 5B to the operation center 4.

The operation center 4 is fixed on the ground and receives the transmitted signals via the satellites from the transponders mounted on the vehicles. The operation center 4 and a user center 6 are connected via, e.g. a telephone line 7. The vehicles 5A and 5B are moving objects such as trucks or other vehicles. A transponder is installed in each vehicle.

Two-way communication can be performed between the operation center 4 and each of the vehicles 5A and 5B through the satellite 1. The operation center 4 transmits a signal having a carrier frequency of, e.g., 2.5 GHz to the satellite 1. This signal is sent to the vehicles 5A and 5B via the satellite 1. Each of the vehicles 5A and 5B transits a signal having a carrier frequency of, e.g., 1.6 Ghz and this signal is sent to the operation center 4 via he satellite 1.

When the present positions of the vehicles 5A and 5B is to be calculated, a response signal is output from each transponder which is mounted on the vehicles 5A and 5B in response to an interrogation signal which is sent from the operation center 4 through the satellite 1. This response signal is sent to the operation center 4 through the satellite 1 and is also sent to the operation center 4 through the satellites 2 and 3. Due to the differences in length of the propagation paths, time differences occur in the arrival times of the response signals transmitted through the satellites 1, 2 and 3 to the operation center 4. In the operation center 4, the positions of the vehicles 5A and 5B can be obtained on the basis of these time differences.

For example, assuming that an accident occurred in the vehicle 5A, a message indicative of this situation is transmitted from the vehicle 5A to the operation center 4 through the satellite 1.

On the other hand, the present position of the vehicle 5A can be calculated since the response signal which is output from the transponder mounted on the vehicle 5A in response to the interrogation signal transmitted from the operation center is transmitted to the operation center 4 through the satellites 1, 2 and 3.

The situation of and the present position of the vehicle 5A are sent to the user center 6 via the telephone line 7. Therefore, in the user center 6, the velocity and the present position of each vehicle can be known and movement management can be efficiently performed. Assuming that an accident had occurred in the vehicle 5A and that the vehicle 5B is to be moved to the location of the accident so as to rescue the vehicle 5A as mentioned above, the instruction for this condition is sent from the user center 6 to the operation center 4 and the instruction is given from the operation center 4 to the vehicle 5B through the satellite 1. At this time, the situation of and the present position of the vehicle 5A are momently supplied from the operation center 4 to the vehicle 5B through the satellite. Thus, the vehicle 5B can promptly move to the location of the vehicle 5A which has had an accident.

The present invention is applied to the foregoing satellite-based vehicle position determining and communicating service system. As mentioned above, in this system, when the vehicle position has been determined, the response signals are output from the transponders mounted in the vehicles in response to the interrogation signal from the operation center 4. The response signals are sent to the operation center 4 through the satellites 1, 2 and 3. The position of each vehicle is calculated using the time differences among the arrival times of the response signals transmitted through the satellites 1, 2 and 3 to the operation center 4, respectively.

FIGS. 3A-3F are timing charts of respective signals which exist until the interrogation signal generated from the operation center 4 are received by the transponders mounted in the vehicles and the response signals in response to the interrogation signal are then received by the operation center through the satellites, respectively.

Figure 3A:
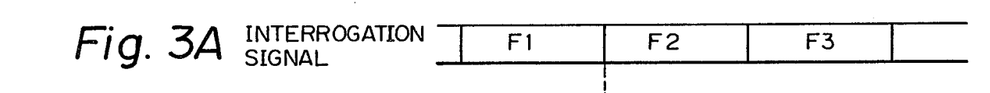
Figures 3B, 3C:
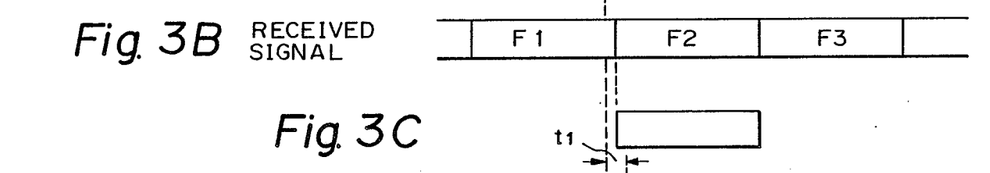

When the position of a vehicle is to be determined, an interrogation signal $S_1$ consisting of frames $F_1, F_2, F_3, \ldots$ is output from the operation center 4 as shown in FIG. 3A. The signal $S_1$ is received by the transponder of each vehicle through the satellite 1 as shown in FIG. 3B. The frame signal corresponding to each vehicle is included in each frame of the interrogation signal $S_1$ from the operation center 4. The transponder of each vehicle receives the interrogation signal $S_1$ and discriminates whether the frame number obtained by decoding the received signal coincides or not with its own frame number assigned to the transponder. If they coincide, the vehicle outputs a response signal $S_2$ including the own frame number assigned as shown in FIG. 3C. Therefore, the response signal $S_2$ is output from the transponder at a timing which almost coincides with the leading edge of a predetermined frame in the signal (FIG. 3B) which corresponds to the interrogation signal $S_1$ sent from the operation center 4 and which is received by the transponder of each vehicle. The response signal $S_2$ is sent to the operation center 4 through the satellites 1, 2 and 3, respectively.

Figures 3D, 3E, 3F:
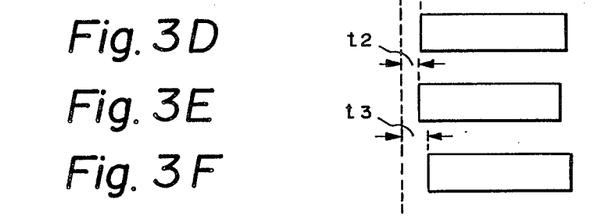

As shown in FIGS. 3D to 3F, the times until the response signal $S_2$ reaches the operation center 4 through the satellites 1, 2 and 3 have time differences which correspond to the distances from the operation center 4 to the satellites 1, 2 and 3 and to the distances from the satellites 1, 2 and 3 to the vehicles, respectively. In the operation center 4, the times until the response signal $S_2$ which are responsive to the interrogation signal reaches the operation center 4 through the satellites 1, 2 and 3 are measured by using the transmission time of each frame of the interrogation signal $S_1$ (FIG. 3A) as a reference, respectively. It is now assumed that the time until the response signal $S_2$ arrives through the satellite 1 is $t_1$, the time until the response signal $S_2$ arrives through the satellite 2 is $t_2$, and the time until the response signal $S_2$ arrives through the satellite 3 is $t_3$. The position, i.e., the latitude, longitude, and altitude of each vehicle are calculated using the times $t_1$, $t_2$, and $t_3$.

For example, it is now assumed that the position of the vehicle 5A is to be obtained. In FIG. 2, assuming that the distance between the operation center 4 and the satellite 1 is $l_1$ and the distance between the satellite 1 and the vehicle 5A is $l_{10}$.

$$2(l_1 + l_{10}) = C \cdot t_1 \tag{1}$$

where C denotes the velocity of light. Similarly, assuming that the distance between the operation center 4 and the satellite 2 is $l_2$ and the distance between the satellite 2 and the vehicle 5A is $l_{20}$, $$(l_1 + l_{10}) + (l_{20} + l_2) = C \cdot t_2 \tag{2}$$

Assuming that the distance between the operation center 4 and the satellite 3 is $l_3$ and the distance between the satellite 3 and the vehicle 5A is $l_{30}$, $$(l_1 + l_{10}) + (l_{30} + l_3) = C \cdot t_3 \tag{3}$$

The satellites 1, 2 and 3 are geostationary satellites. The operation center 4 is the ground station and is fixed on the ground. Therefore, the distances $l_1$, $l_2$, and $l_3$ are already known. Therefore, if the times $t_1$, $t_2$, and $t_3$ are obtained, the distances $l_{10}$, $l_{20}$, and $l_{30}$ can be obtained by using the equations (1) to (3). Thus, the position of the vehicle 5A can be calculated by applying the principle of triangulation using the distances $l_{10}$, $l_{20}$, and $l_{30}$.

When the position of each vehicle is determined in this manner, in order to decide the accurate position of each vehicle, in the transponder mounted on each vehicle, the time of reception of the leading edge of, e.g., a frame of the interrogation signal $S_1$ which is sent from the operation center 4 must be accurately made to coincide with the output time of the response signal $S_2$ which is responsive to the interrogation signal $S_1$.

However, since the circuit device constituting the transponder in each vehicle has its own operation delay time, it is difficult to accurately make the output timing of the response signal $S_2$ coincide with the reception time of the leading edge of a frame of the interrogation signal $S_1$ sent from the operation center 4.

Therefore, according to the present invention, the time until the transponder mounted on each vehicle receives the interrogation signal and then transmits a responsive signal in response to the interrogation signal is measured using every transponder. When the vehicle position is determined, the position measurement difference is eliminated by using this response time information.

Figure 4A:
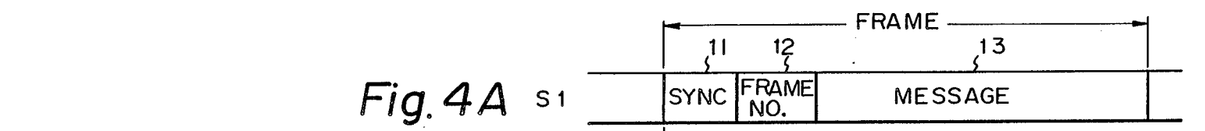
FIGS. 4a–4b show signal formats of an interrogation signal and a response signal.
Figure 4B:
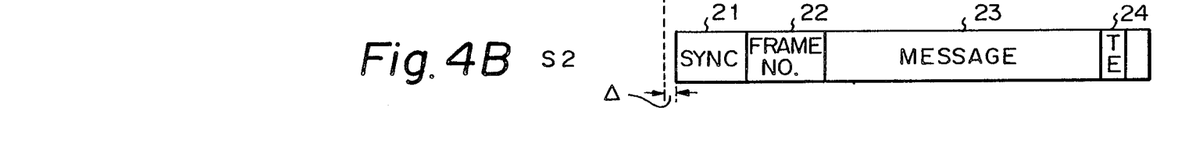

FIGS. 4A and 4B show examples of signal transmission formats of each frame of the interrogation signal which is output from the operation center and of the response signal output from a vehicle. The response time information which is unique for each of the transponders is transmitted from each transponder to the operation center through the satellite.

Each frame of the interrogation signal $S_1$ shown in FIG. 4A which is sent from the operation center 4 includes a sync signal portion 11, a frame number portion 12, and a message portion 13.

The response signal $S_2$ which is transmitted from each transponder mounted on the vehicles has a sync signal portion 21, a frame number portion 22, and a message portion 23 as shown in FIG. 4B. A portion 24 for transmitting the response time information is provided in the message portion 23. The frame number which locates each frame of the interrogation signal $S_1$ is sent from the operation center 4 and is detected.

When a special frame number coincides with the frame number assigned to the vehicle, the frame number assigned which corresponds to this special frame number is set in the frame number portion 22 in the response signal.

The response time information TE is provided so as to instruct a time lag until each vehicle receives the interrogation signal and then transmits a response signal in response to this interrogation signal. For example, a standard response time of the transponder is used as a reference and the response time difference is transmitted as the response time information to the operation center 4. As another example, a method whereby the response time itself is transmitted is also considered. When the response time difference is transmitted as information, for example, the data area of one byte to transmit the response time difference $\Delta t$ from $-128$ nsec to $+127$ nsec is held. The response signal $S_2$ is sent to the operation center 4 through the satellites 1, 2 and 3. In the operation center 4, the frame in the signal $S_1$ to which the response signal $S_2$ corresponds is determined on the basis of the number in the frame number portion 22 in the response signal $S_2$. The position of each vehicle is decided on the basis of the time differences among the times until the response signals $S_2$ transmitted through the satellites 1, 2 and 3 reach the operation center 4. At this time, the reception times of the signals transmitted via the different propagation paths and received by the vehicles are corrected by the response time difference information TE included in the response signal $S_2$.

Assuming that the time difference value transmitted as the response time difference information TE is $\Delta t$, the equations (1) to (3) are corrected by this value $\Delta t$. Thus, the distances $l_{10}$, $l_{20}$, and $l_{30}$ are obtained as follows:

$$2(l_1 + l_{10}) = C(t_1 \pm \Delta t) \quad (11)$$

$$(l_1 + l_{10}) + (l_{20} + l_2) = C(t_2 \pm \Delta t) \quad (12)$$

$$(l_1 + l_{10}) + (l_{30} + l_3) = C(t_3 \pm \Delta t) \quad (13)$$

Therefore, if the response time which is peculiar to the transponder mounted on each vehicle is previously known, the reception time can be corrected for every transponder when the vehicle position is calculated.

Even if the output timing of the response signal $S_2$ is not perfectly coincident with the leading edge of a frame of the interrogation signal $S_1$ and a time lag peculiar to the transponder attached to each vehicle exists, the position of the vehicle can be accurately determined.

Figure 5:
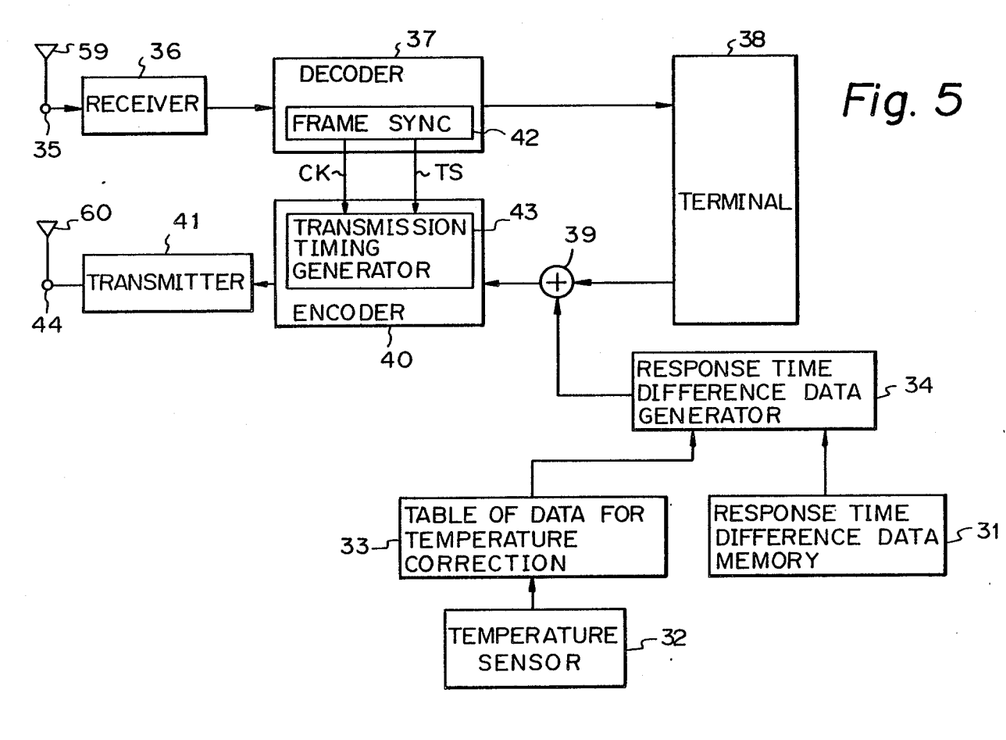
FIG. 5 is a block constitutional diagram of the main section in a transponder mounted on each vehicle.

FIG. 5 shows an example of the construction of a main section in the transponder which is installed in each vehicle to which the invention is applied. In FIG. 5, a response time difference data memory 31 serves as a time lag information storing means for storing the time lag information. The data corresponding to the response time difference $\Delta t$ is measured by a tester 51 in a manner which will be explained hereinafter, and is previously stored in the memory 31. In this example, a temperature sensor 32 and a table 33 of data for temperature correction are provided. An output of the memory 31 and an output of the data table 33 are supplied to a response time difference data generating circuit 34 which serves as the time lag correcting means.

Each circuit device constituting the transponder of each vehicle can be influenced by temperature changes, so that the response time lag changes. The temperature sensor 32 is provided so as to measure the ambient temperature of the circuit device constituting the transponder and to correct for changes in response time lag. The data table 33 for temperature correction is used with an output signal of the temperature sensor 32. The response time lag which is stored in the memory 31 is corrected by the output signal of the data table 33.

The data indicative of the response time lag which is output from the generating circuit 34 is included as the response time difference information TE to the response signal $S_2$ and is transmitted.

The interrogation signal transmitted from the operation center 4 is spectrum diffused by a PN code (high speed pseudo random code train) and is transmitted by using a carrier which has a carrier frequency of e.g., 2.5 GHz. By transmitting a signal after the spectrum has been diffused as explained above, the resistance to interference and the speech security property are improved. The accuracy of determined position is also improved. The signal from the operation center 4 is received by an antenna 59 on each vehicle through the satellite 1. The signal received by the antenna 59 is supplied from an antenna terminal 35 to a receiving circuit 36.

The signal received by the receiving circuit 36 is amplifier and converted into a center frequency having a predetermined frequency and is further converted into a base band signal. An output of the receiving circuit 36 is supplied to a decoder 37.

A PN signal generator for generating the same PN series as the PN series of the spectrum diffused interrogation signal which is sent from the operation center 4 through the satellite 1 is provided in the decoder 37. The PN code of the input signal is compared with the code which is generated by the PN code generator and the signals are synchronized and locked at a position of the maximum correlation value. In this manner, the spectrum inverse diffusion is performed. The phase synchronization is held by a costas loop and the data is decoded.

The decoded data is supplied to a terminal 38. The terminal 38 may be an input/output device such as a key switch, a display, or the like. The terminal 38 is made operative on the basis of the data sent from the decoder 37. A command from the operation center 4 is displayed on the display. The information which is to be transmitted to each vehicle is input by a keyboard or other means.

So as to determine the vehicle's position, a packet of the response signal $S_2$ is formed from the terminal 38 as shown in FIG. 3B. The response time difference information TE which is generated from the generating circuit 34 is added to the response signal $S_2$ by an adder 39. The response signal $S_2$ which includes the information TE is supplied to an encoder 40. A message is also included in the response signal $S_2$.

The encoder 40 spectrum diffuses the response signal $S_2$ by using the PN code and transmits the diffused signal using a carrier with a carrier frequency of, 1.6 GHz, for example. The response signal $S_2$ is sent from the encoder 40 to a transmitter 41 with a timing which coincides with the leading edge of a predetermined frame of the interrogation signal $S_1$ which was received as an input at the antenna terminal 35. In order to synchronize the leading edge of the frame of the interrogation signal $S_1$ with the output timing of the response signal $S_2$, a clock signal CK and a timing signal TS are supplied from a frame sync circuit 42 in the decoder 37 to a transmission timing generator 43 in the encoder 40. The timing signal TS is synchronized with the leading edge of the frame of the interrogation signal $S_1$ which is received. When the timing signal TS is supplied to the encoder 40, the spectrum diffused response signal $S_2$ is supplied from the encoder 40 to the transmitter 41 and then to the antenna 60 and is transmitted using a carrier having a carrier frequency of 1.6 GHz.

The output of the transmitter 41 is supplied from an antenna terminal 44 to the antenna 60 and is sent to the operation center 4 through the satellites 1, 2 and 3.

In the foregoing embodiment, the transmission timing of the response signal $S_2$ is made to be coincident with the leading edge of the frame of the interrogation signal $S_1$. However, the transmission timing of the response signal $S_2$ is not limited to the leading edge of the frame of the interrogation signal $S_1$ but can be also be made to be coincident with other portions of the signal.

Figure 6:
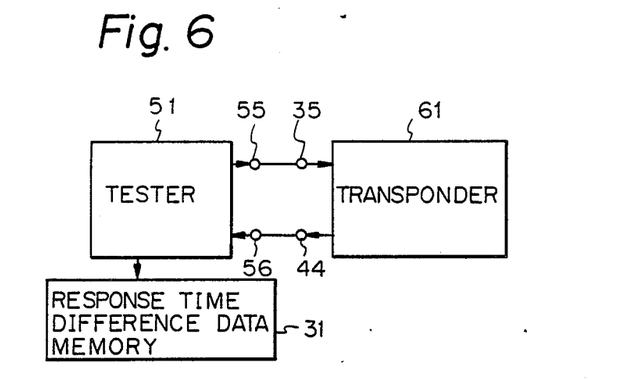
FIG. 6 is a diagram for explaining the measurement of a time lag of a response signal to an interrogation signal of a transponder mounted on each vehicle.

As mentioned above, the response time lag data corresponding to the response time difference $\Delta t$ is stored in the memory 31. This response time difference $\Delta t$ is preliminarily measured by the tester 51 as shown in FIG. 6. The response time difference $\Delta t$ measured by the tester 51 is stored in the memory 31.

Figure 7:
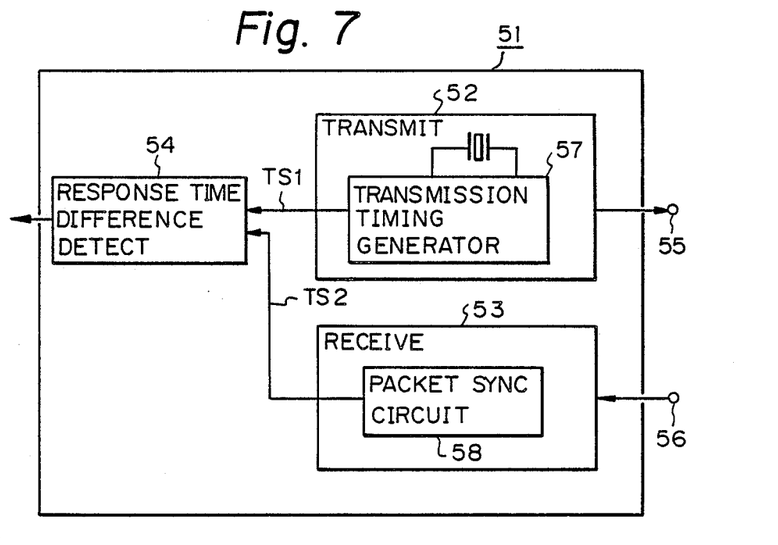
FIG. 7 is a block diagram of a tester which is used in the device of FIG. 6.

As shown in FIG. 7, the tester 51 comprises: a transmitting unit 52 so as to generate a signal having a carrier of a predetermined carrier frequency which is obtained by spectrum diffusing the interrogation signal $S_1$ which is similar to the interrogation signal which is output from the operation center 4. A receiving unit 53 receives a response signal from a transponder 61 which has been measured. The tester 51 also includes a time difference detecting circuit 54 so as to measure the response time difference $\Delta t$. An output terminal 55 of the tester 51 is connected to the antenna terminal 35 of the transponder 61. An input terminal 56 of the tester 51 is connected to the antenna terminal 44 of the transponder 61.

The interrogation signal from the transmitting unit 52 of the tester 51 is output from the output terminal 55 and is supplied to the transponder 61. A timing signal $TS_1$ is output from a transmission timing generator 57 in response to the leading edge of each frame of the interrogation signal which is output from the transmitting unit 52.

When the interrogation signal is supplied from the transmitting unit 52 of the tester 51 to the transponder 61, the response signal $S_2$ is formed in the transponder 61 and the response signal $S_2$ with a packet format which has a carrier with a predetermined carrier frequency and which has been spectrum diffused is output from the antenna terminal 44 of the transponder 61. This output signal is supplied from the antenna terminal 44 to the input terminal 56 as an input to the receiving unit 3 of the tester 51. When the response signal $S_2$ having the packet format from the transponder 61 is detected by the receiving unit 53, a timing signal $TS_2$ is output from a packet sync circuit 58 in the receiving unit 53.

The timing signal $tS_1$ from the transmission timing generator 57 in the transmitting unit 52 and the timing signal $TS_2$ from the packet sync circuit 58 is the receiving unit 53 are supplied to the time difference detecting circuit 54. The time difference between the timing signals $TS_1$ and $TS_2$ is measured by the detecting circuit 54. By subtracting a preset standard response time for each transponder from this measured time difference, the data indicative of the response time difference $\Delta t$ is formed. This response time difference data is stored in the memory 31 of the transponder 61.

Therefore, according to the invention, the response time difference of the output timing of the response signal $S_2$ is previously measured on the basis of the leading edge of the frame of the interrogation signal $S_1$ as a reference. The response time difference data which is unique for each transponder and which has been stored in the transponder is included in the response signal $S_2$ and this signal is transmitted to the operation center 4. In the operation center 4, the times of receival of the response signal $S_2$ through the satellites 1, 2 and 3 are corrected by using the response time difference data. Thus, even if the output timing of the response signal $S_2$ is not precisely coincident with the leading edge of the frame of the interrogation signal $S_1$, the position measurement difference due to disturbance of the output timing is eliminated. In the invention, there is not need to perform adjustments to precisely make the output timing of the response signal $S_2$ coincide with the timing of, the leading edge of the frame of the interrogation signal $S_1$. Also, there is no need to use a high speed device such as an ECL or the like as a circuit device as the transponder on a vehicle. Therefore, the circuit size and cost can be reduced as compared to prior art systems.

The present invention is not limited to the foregoing embodiments but many modifications and variations are possible which are within the spirit and scope of the appended claims of the invention.

I claim as my invention:

1. A method for communicating with and determining the position which uses a satellite-based vehicle position determining and communicating service system comprising: transmitting with a transponder which is carried by each one of a plurality of vehicles which are traveling on or above the earth's surface a predetermined response signal in response to reception of an interrogation signal; receiving and retransmitting with at least two or more satellites which have repeaters in each satellite the response signal transmitted from said transponder and retransmitting the response signal, said satellites positioned at spaced orbital locations above the earth's surface; receiving with a ground station the response signal from said transponder which have been retransmitted from each of said satellites and said ground station determining the position of each vehicle which have a transponder on the basis of each received time of the signal from the time of transmission of said interrogation signal to the time of reception of said response signal, transmitting with said transponder of said vehicle information of the time lag of said vehicle transponder from the reception signal in said response signal, and calculating at said ground station, a position measurement difference of the vehicle by correcting each of said required times on the basis of said information of the time lag of said vehicle transponder.

2. A vehicle positioning system in a satellite-based system for communicating with and determining the position of a vehicle comprising: a vehicle transponder which is carried by each of a plurality of vehicles which travel on or above the earth's surface and which transmits a predetermined response signal in response to reception of an interrogation signal; at least two or more satellites each of which have repeaters for receiving the response signal transmitted from said vehicle transponder and for retransmitting the response signal, said satellites positioned at spaced orbital locations above the earth's surface; and a ground station for receiving the response signal from said vehicle transponder which has been retransmitted from each of the satellites and for measuring the position of each vehicle which has a vehicle transponder using the transmit time required for signals from the transmission of said interrogation signal to the reception of said response signal, wherein said vehicle transponder has receiving means for receiving said interrogation signal, decoding means for decoding the interrogation signal received by said receiving means; encoding means for forming the response signal responsive to the interrogation signal which is synchronized with a strobe signal which is supplied from said decoding means, transmitting means for transmitting an output signal of said encoding means and which uses a carrier having a predetermined carrier frequency, and a time lag storing means for previously storing information regarding the time lag from the reception time of said interrogation signal to the transmission time of said response signal of said vehicle transponder, and wherein the time lag information of said vehicle transponder which has been stored in said time lag storing means is included in the response signal and such response signal is then transmitted by said vehicle transponder.

3. A system according to claim 2, wherein said transponder further includes a temperature measuring means for measuring the ambient temperature of circuit devices which form said vehicle transponder, a time lag correcting means for correcting said time lag information of said vehicle transponder stored in said time lag storing means with an output signal from said temperature measuring means, and wherein the time lag information which is output from said time lag correcting means is included in the response signal and such response signal is then transmitted by said vehicle transponder.

4. A system according to claim 2, wherein a value indicative of a time difference between the time lag stored in said time lag storing means and the time lag data of a standard vehicle transponder is stored in the time lag storing means in said vehicle transponder.

5. A system according to claim 2 including a tester which can be connected to said vehicle transponder and to said time lag storing means.

6. A system according to claim 5 wherein said tester includes a receive unit which has a packet sync circuit, a transmit unit which has a transmission timing generator, and a response time difference detector, which is connected to said receive unit and said transmit unit in said vehicle transponder.

* * * * *